United States Patent [19]

Sundberg

[11] Patent Number: 4,818,313

[45] Date of Patent: Apr. 4, 1989

[54] METHOD FOR REGULATING THE ENERGY SUPPLY TO A SEALING DEVICE FOR THE SEALING OF THERMOPLASTIC MATERIAL

[75] Inventor: Anders Sundberg, Bankogatan 20, Sweden

[73] Assignee: Tetra Pak International, Lund, Sweden

[21] Appl. No.: 870,360

[22] Filed: Jun. 4, 1986

[30] Foreign Application Priority Data

Jun. 28, 1985 [SE] Sweden .................... 8503214

[51] Int. Cl.$^4$ .................... B29C 65/08; G01N 29/00
[52] U.S. Cl. .................... 156/64; 156/73.1; 156/366; 219/492
[58] Field of Search .................... 156/366, 73.1, 64; 219/492; 361/195, 103, 106, 79, 94, 96

[56] References Cited

U.S. PATENT DOCUMENTS

| | | | |
|---|---|---|---|
| 3,857,279 | 12/1974 | Salzer et al. | 73/67.2 |
| 3,980,515 | 9/1976 | Reil et al. | 156/97 |
| 4,159,876 | 7/1979 | Egan et al. | 219/492 X |
| 4,199,808 | 4/1980 | Peterson | 361/195 X |
| 4,313,778 | 2/1982 | Mims | 156/366 X |
| 4,513,342 | 4/1985 | Rocha | 361/96 X |
| 4,696,708 | 9/1987 | Keller et al. | 156/366 X |

FOREIGN PATENT DOCUMENTS 3138520 1/1983 Fed. Rep. of Germany .
3313918 10/1983 Fed. Rep. of Germany .
57-178825 4/1982 Japan .

OTHER PUBLICATIONS

*Ultrasonics,* Sep. 1976, "Welding of Thermoplastics by Ultrasound", A. Shoh.

*Primary Examiner*—David Simmons
*Attorney, Agent, or Firm*—Burns, Doane, Swecker & Mathis

[57] ABSTRACT

A method for regulating the supply of energy to a sealing device for the sealing of thermoplastic material includes supplying electric energy to a sealing device pressed against the combined thermoplastic material with whose help the said electric energy is converted to thermal energy. The amount of energy supplied to the sealing device is variable to compensate for heat losses brought about by heat leakage during the sealing operation. An arrangement for carrying out the method is also disclosed.

9 Claims, 4 Drawing Sheets

METHOD FOR REGULATING THE ENERGY SUPPLY TO A SEALING DEVICE FOR THE SEALING OF THERMOPLASTIC MATERIAL

FIELD OF THE INVENTION

The present invention relates to a method for regulating the supply of energy to a sealing device for the sealing of thermoplastic material with the object of achieving an optimum sealing result. The invention also relates to an arrangement for the realization of the method.

BACKGROUND OF THE INVENTION

In the welding together of plastic material it is important to adapt the supply of energy in such a manner that a tight and mechanically strong sealing joint is achieved. The sealing is accomplished in that two or more layers of plastic material are combined and are pressed together by means of a sealing element with simultaneous supply of heat or heat-generating energy, when the plastic material is caused to melt and its combined surface layers are fused together.

If the energy supplied is insufficient the tightness and strength are inadequate owing to the energy supplied not being capable of heating the plastic material to such a degree that a continuous fusing together of the layers pressed against each other is achieved. On the other hand, if the energy supply is excessive, burning of the material may occur, or else the material may be melted down to such a degree that it is removed from the location of the seal which consequently will be thinner and less strong.

In the sealing of laminated material comprising non-thermoplastic layers, such as e.g. laminate consisting of plasticcoated cardboard, the problem is not so pronounced as in the case where the material intended for sealing consists of pure plastic material or, in extreme cases, foamed plastic material.

In the sealing of expanded plastic materials, so-called foamed plastic material, which consists of a large amount of small cells with thin walls of plastic material,- there is great need of the correct amount of energy being supplied to the sealing zone. The thin walls cannot be subjected to high pressure, since they would then be crushed together or "collapse". Such a collapse occurs too when they are exposed to excessive heat, since the thin cell walls will then melt down.

It has been known previously that sealing may be carried out by means of sealing elements which give off a certain defined amount of energy. This is done, for example, in the so-called "spin welding process", where the heat generated is in the form of frictional heat. "Spin welding" is carried out in such a manner that two pieces of plastic which are to be combined (usually two cup-shaped parts which are to be joined to a container) are rotated in relation to each other and that they are brought together while still rotating. The braking of the rotating parts, of which at least one is coupled to a flywheel with a certain inertia, generates frictional heat which is sufficient for joining the plastic parts to each other. By adjusting the speed of rotation etc. it is thus possible to determine accurately the energy which the rotating part has, and the whole of this kinetic energy is braked and is transformed to thermal energy when the plastic parts are brought together.

It is also known that with the help of electric contact breakers or regulators the length of the heat pulses can be adapted in such a manner that a certain defined energy is given off from a sealing element. In most cases these regulators are sufficient for adjusting the energy supplied, in particular when the contact pressure in each case of sealing is the same.

In certain cases, however, it is difficult to achieve conditions which given constant sealing pressure, e.g. in cases where the sealing objects are placed in a chain or a line of forming spaces connected to one other. It is difficult, for example, to make the forming spaces exactly like one another or to form the sealing objects in exactly the same manner. This may mean that the parts intended for sealing, when they are brought into sealing position and into contact with sealing elements, may receive different sealing pressure. It has been found that the sealing pressure has a strong influence on the energy supply, especially if the energy is supplied in the form of ultrasonics where high-frequency mechanical vibration produces heating of the material in a manner which partly resembles the earlier "spin welding process", that is to say the mechanical energy supplied is converted to frictional heat in the contact zone between the materials. Since the mechanical energy is not transmitted equally effectively when the contact pressure is low, a longer sealing time is required in such a case for the same energy to be generated in the sealing zone. In order to obtain the same sealing result and the same amount of energy supply it is necessary, therefore, to adjust the sealing time to the contact pressure, but since the packing containers intended for sealing, which arrive in a line after one another, are not exactly the same or placed in exactly the same way into their holders, the contact pressure may vary between packages following each other, so that there has to be an individual regulation in each sealing instance.

SUMMARY OF THE DISCLOSURE

The present invention provides directions in respect of a method and an arrangement for the realization of such a regulation, and the features characteristic for the invention are evident from the enclosed claims.

However, it has been found that this regulation too is not satisfactory in all field of application, and especially when foamed plastic material is laminated with a metal foil in order to increase its gas-tightness the sealing result may be different when diverse sealing times are used, even if the energy supply to the sealing element is exactly the same. The reason for this is that certain heat losses occur during the sealing operation and that these heat losses, broadly speaking, are proportional to the length of the sealing time. Thus the heat losses during a long sealing time will be greater than the heat losses in a shorter sealing period, which means that the energy available for the sealing will be less in the case of long sealing times, yet, as mentioned previously, long sealing times must be resorted to when the contact pressure between the sealing element and the sealing object is low.

The invention provides means, however, to overcome this problem too and to achieve an automatic compensation for long sealing times and, moreover, a compensation which can be varied, since the heat losses are not the same in the case of all packing material combinations.

BRIEF DESCRIPTION OF THE DRAWING

An embodiment of the invention will be described in the following with reference to the enclosed schematic drawing, wherein.

DETAILED DESCRIPTION OF THE PREFERRED EMBODIMENT

Figure 1:
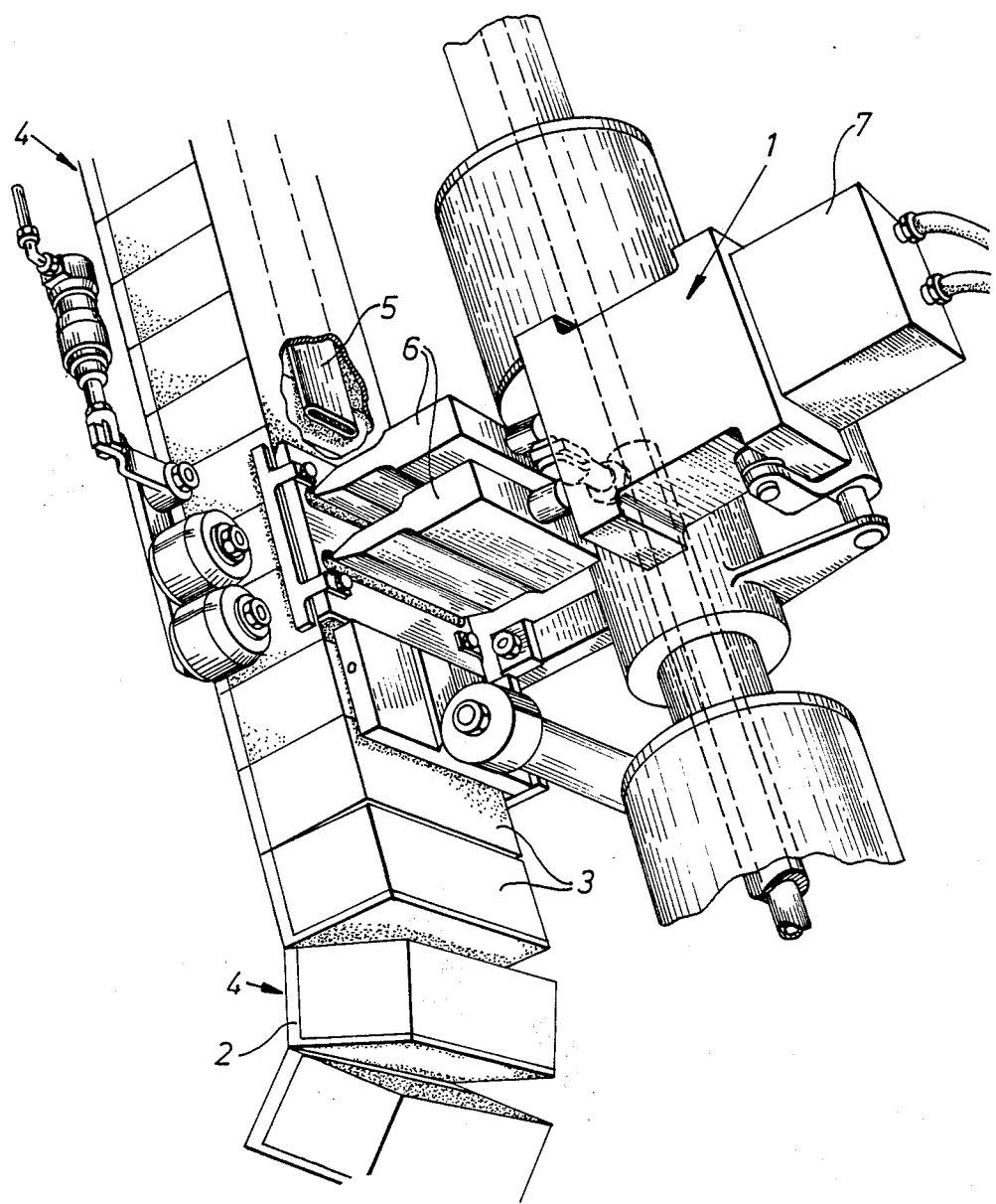
FIG. 1 is a schematic view of an arrangement for the manufacture of a packing container of foamed plastic material by welding.

The arrangement shown in FIG. 1 consists of a sealing element 1 where the sealing energy is supplied in the form of ultrasonic vibrations which through friction in the contact surfaces between the materials intended to be welded generate the heat which is required for sealing.

In the case shown, the sealing object consists of a line of coherent packing containers 3 which are formed in a chain 4 of coherent forming parts 2. In the case shown here, the packages 3 have been formed from two separate webs of foamed plastic material, one of which is formed into the coherent line of U-shaped parts in that the web is made to attach itself to the internal contours of the forming parts 2. Above this web of coherent U-shaped parts is arranged a second web whose central part covers the parts of the U-shaped spaces facing upwards while the edge zones of the second web are divided into lugs which are folded down and sealed against the lateral edges of the shaped parts. The coherent cavities so formed are filled with a liquid product which is supplied through a long and narrow filling pipe 5 situated above the raised fold of the first web which has been formed over the projecting walls of the forming parts 2 and the inside of the second web. After the filling operation the said first and second web would be joined to each other in a sealing joint, the raised lateral walls of the forming parts 2 serving as a holding-up tool in the sealing. As shown in the figure, the sealing element 1 has a pair of sealing jaws 6 consisting of ultrasonic vibrators which obtain their energy from an electrically fed vibration generator 7.

Even assuming it is endeavoured to make the forming parts 2 as identical as possible, it has been found that it is impossible to achieve the same sealing conditions for each link in the forming chain without the contact pressure between the sealing jaws 6 and the sealing zones being able to vary. As mentioned earlier, differences in the contact pressure between the sealing jaws 6 and the sealing object act in such a manner that the ultrasonics energy supplied to the sealing jaws will be different in different instances of sealing.

In accordance with the invention this phenomenon can be compensated by automatically prolonging the sealing times when the contact pressure is low and, consequently, the power of the sealing jaws is low. It is the aim, as mentioned previously, that the energy content in a sealing pulse should always be the same.

Figure 2:
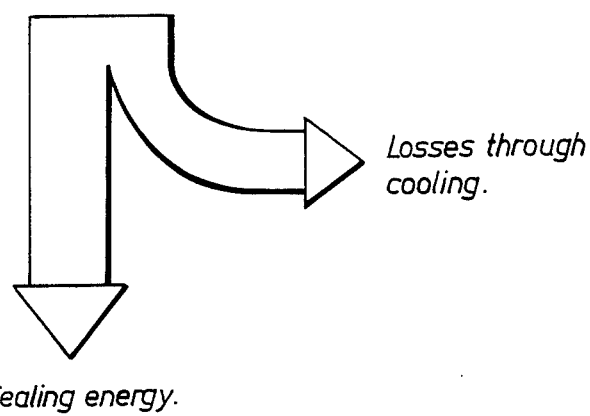
FIG. 2 is a schematic view illustrating to illustrate the effect of the heat losses on the sealing result.

As is evident from FIG. 2, there are losses, though, during the sealing in the form of heat which is cooled away, so that not all the energy generated is utilized for the sealing. The heat losses, broadly speaking, are proportional to the length of the sealing period which means that the energy available for the sealing diminishes during long sealing periods and may diminish to such an extent that the sealing result becomes inadequate. This phenomenon is more pronounced in packing material containing an aluminium foil layer owing to the aluminium foil conducting the heat away more effectively from the sealing location. The abovementioned behavior is illustrated in FIG. 5 which shows a power-time diagram demonstrating the relationship between power and time for achieving a good sealing result.

In the case shown, the sealing pulses (I, II, III) have been approximated in such a manner that the power is constant during the whole pulse duration, that is to say the pulses are recorded in the diagram as rectangles. The area of the rectangles I, II, III is the same, which means that they represent the same energy content. The three sealing pulses shown have different sealing time, however and therefore different pulse output. The sealing pulse I, for example, represents the sealing time of the distance C—D and the power of the distance C—A. The corner point B of the sealing pulse thus represents a point on a curve 8, and on this curve all corresponding corner points for the rectangles representing sealing pulses will be situated even if the pulse duration varies as has been shown in FIG. 5. The curve 8 thus represents the relationship between required power and required time for a certain sealing result to be achieved.

Figure 5:
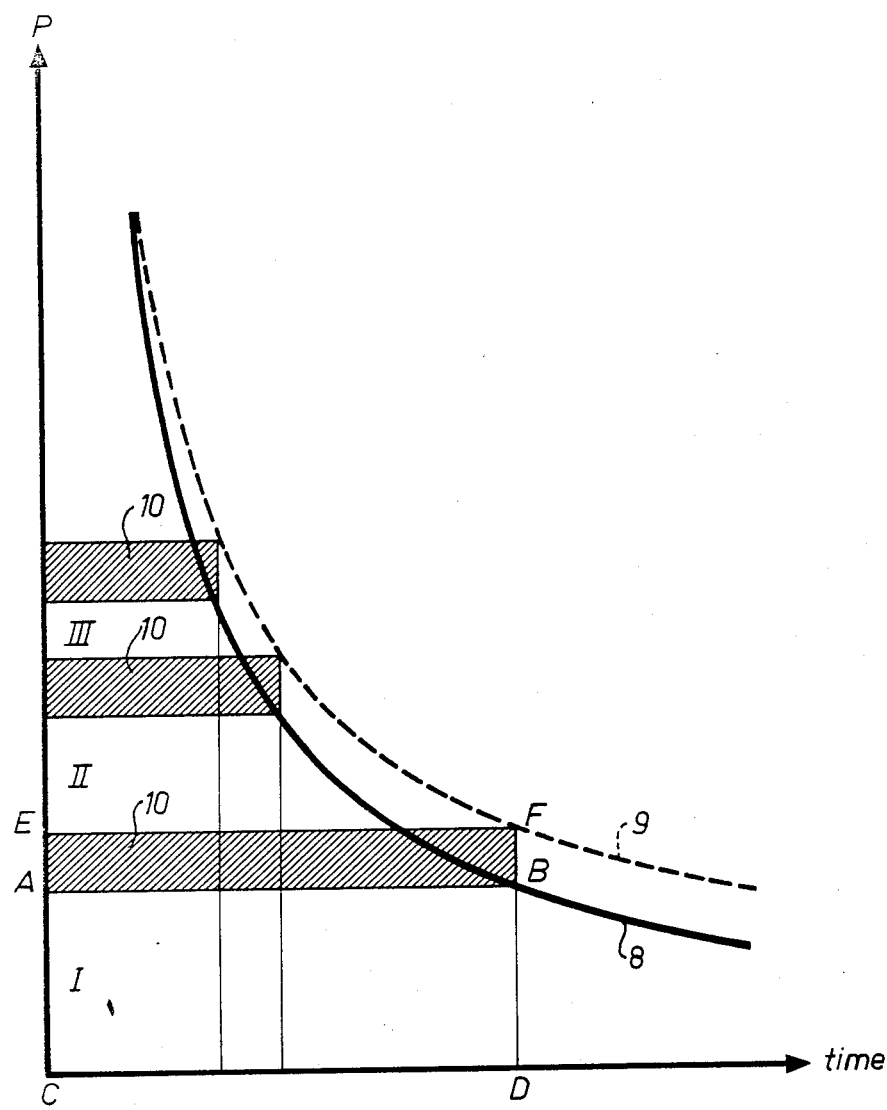
FIG. 5 is a power-time diagram in respect of a sealing operation in accordance with the invention.

As mentioned previously, however, the heat losses increase with increasing sealing time and this too is illustrated in FIG. 5. It has been found that the heat losses are relatively constant and proportional to the sealing time, and in FIG. 5 the heat losses which are represented by hatched panels have been marked 10. It is evident from FIG. 5 that the heat losses during the short sealing pulse III are considerably less than the heat losses during the longer sealing pulse I. This means that the heat losses will reduce the energy of the sealing pulses to such an extent that an inferior sealing result is obtained unless compensation is made for the increased heat losses during a prolonged sealing period. In FIG. 5 the heat losses 10 too have been approximated as rectangles which agree relatively well and these heat losses have been added to, that is to say arranged above, their respective sealing pulses I, II, III. The energy which is conducted away through the packing material during the sealing pulse I is represented by the rectangle A—E—F—B and the energy supplied to the sealing generator thus has to be compensated to cover the losses by an energy which is equivalent to the hatched panel 10 being added to the sealing pulse I.

The corner point F of the rectangle C—E—F—D which represents the energy supplied from the sealing generator to the sealing element after compensation constitutes a point on a curve 9 which in FIG. 5 is shown as a broken line. This curve 9 will go right through the corresponding corner points on all compensated sealing pulses, and a comparison between the curves 8 and 9 makes evident that a varying sealing effect, which may be due for example to varying sealing pressure, cannot merely be adjusted by the length of the sealing period so as to make the energy-transmitting generator deliver a constant energy pulse, but it is also necessary to take into account that the losses increase with increasing sealing time.

Figure 3:
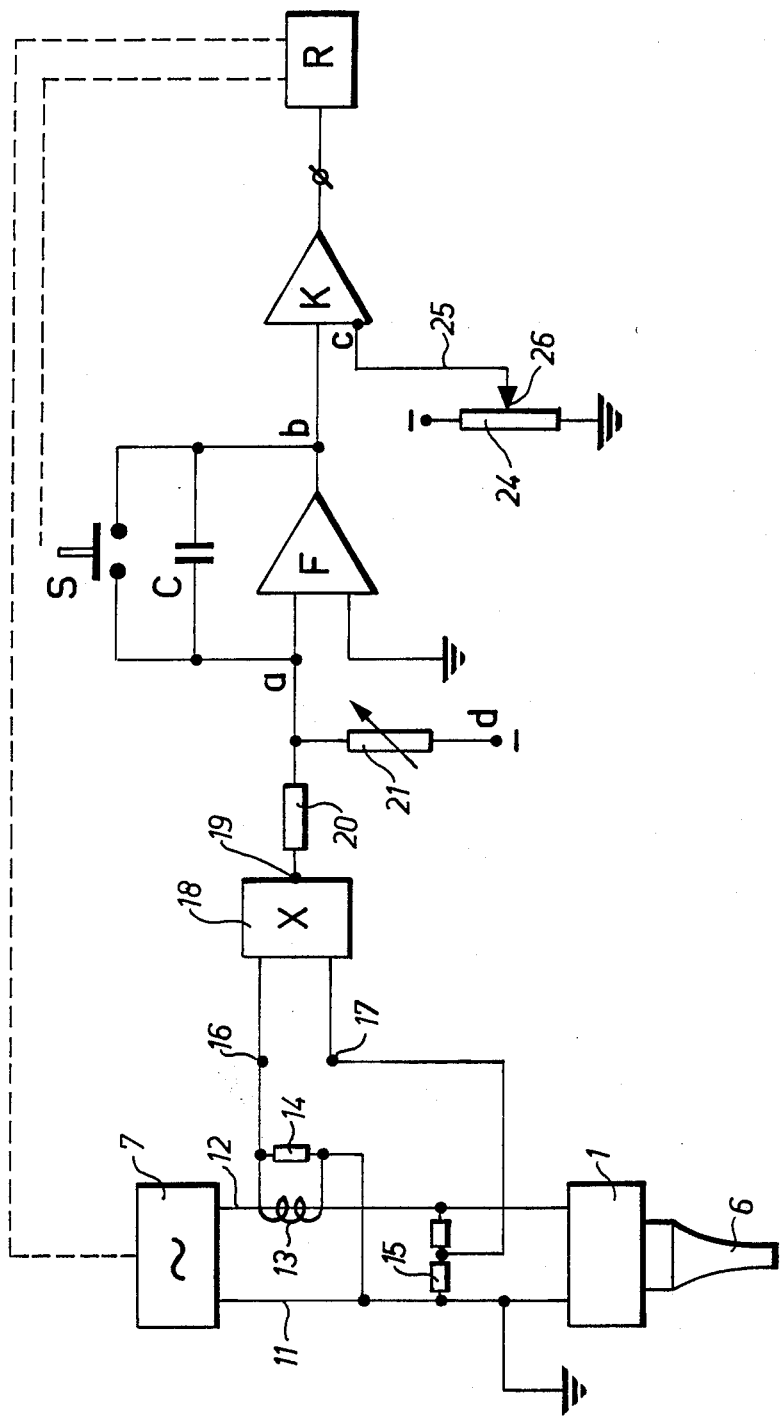
FIG. 3 is a schematic view of for an arrangement in accordance with the invention.

To carry out the adjustment of the duration of the energy pulse which is necessitated by the effect of the sealing pulse given off being able to vary and to compensate for cooling during the sealing pulse an arrangement may be used of the type which is shown schematically in FIG. 3. As in FIG. 1, it is assumed that the sealing operation is to take place by means of ultrasonics, i.e. a generator 1 converts electric energy to mechanical vibrations which are transmitted to an ultrasonics horn 6 designed and mechanically tuned in a special manner, which can be pressed against the sealing object and thereby generates an internal friction between the objects intended for sealing, which are then heated up to such a degree that the thermoplastic layers facing each other fuse together to leak-tight and durable seal. The ultrasonics generator 1 is fed by a source of current 7 which produces an alternating current of a frequency and voltage suitable for the ultrasonics generator. The power delivered from the source of current depends upon the power which is drawn off by the ultrasonics horn 6 during the sealing operation. As mentioned earlier, this power transmitted will be less when the contact pressure is lower than when it is higher and this means that the current from the source of current 7 too will be less, since only so much current is drawn off as it takes to create the mechanical energy which is drawn off by the ultrasonics horn 6. The electric power is conducted from the source of current 7, which is constituted of an oscillator or high-frequency generator, through the leads 11 and 12 to the ultrasonics generator 1 wherein the electric energy is converted to mechanical vibrations. In the lead 12 is arranged a current transformer 13, by means of which is measured the current through the lead 12. Across the secondary winding of the current transformer 13 is arranged a resistor 14, and the voltage across this resistor constitutes a transformed value of the current through the lead 12. Between the feed wires 11 and 12 a voltage divider 15 is also provided which consists of high-ohmic resistors connected. The shown tap point on this voltage divider represents a transformed value of the voltage between the leads 11 and 12. Output voltages from the current transformer 13 and the voltage divider 15 are connected to the input terminals 16 and 17 of a so-called multiplier 18 wherein the voltages in the points 16 and 17 are multiplied with each other so as to provide a value of the electric power delivered by the high-frequency generator 7. The value of this power is represented as a voltage or potential 19 on the output of the multiplier 18. If for a moment the presence of the resistors 20 and 21 is disregarded, a current will flow through the capacitor C. The magnitude of this current depends upon the capacitance of the capacitor and the voltage across the capacitor, that is to say between the points a and b. For a more detailed explanation reference is made to FIG. 4 which shows a voltage-time diagram for the charging of the capacitor C. As is evident from the fully drawn line 22 a capacitor C will be charged according to a non-linear curve if the voltage across the charging circuit is constant and the capacitor will be successively charged with a diminishing current until the voltage across the capacitor corresponds to the charging voltage. Such a charging, therefore, will take place with varying charging current. In the case shown here, however, the charging of the capacitor C takes place with the help of a so-called operational amplifier F which is controlled by the voltage from the multiplier 18. The amplifier F endeavors to charge the capacitor C by means of a constant charging current and, that being so, a charging current which is proportional to the potential at the point 19 which, as mentioned earlier, represents a value of the electric power delivered from the source of current - generator 7. The coupling with the operational amplifier F and the capacitor C is often referred to as an integrator and the constant charging current is obtained because the amplifier controls the potential at the point b so that the voltage drop across the capacitor always remains such that a constant current flows through the same.

As mentioned before, the amplifier F is controlled by the potential from the multiplier 18. The charging current to the capacitor C is also delivered by the multiplier 18 and so as to limit the charging current a resistor 20 is connected between the multiplier 18 and the amplifier F. The voltage drop over the resistor 20 depends on the magnitude of the charging current and will affect the control of the amplifier F, but since the charging current is constant the voltage drop across the resistor 20 caused by the charging current will not vary.

Figure 4:
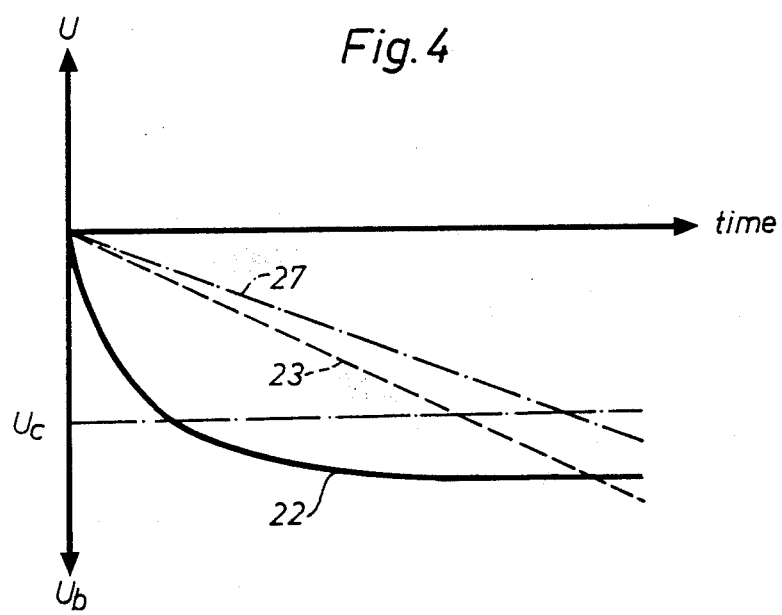
FIG. 4 is a time-voltage diagram showing how the capacitor in the integrating part of the coupling is charged.

In order to obtain a constant current through the capacitor C the potential at the point b thus has to be lowered continuously so that the curve 23 in FIG. 4 may become a straight line. In FIG. 4 is shown how the value $U_b$ is lowered with the charging time on charging of the capacitor according to curve 23. The point b is also connected, however, to a so-called comparator, that is to say, a device which compares two voltages and which, when the comparison shows that the voltages are the same, emits an output signal. The comparator K is connected via its terminal C to a lead 25 which is connected to a variable resistor 24, whose one endpoint is earthed and whose other endpoint is connected to a constant potential. The variable resistor 24 thus acts as a voltage divider making it possible by adjusting the position of the terminal 26 to vary the potential at the point c which, in the case shown here, obtains a negative potential since the resistor 24 is connected between earth potential and a negative potential. The set value of the potential in the point c is designated $U_b$ in FIG. 4 and is represented by a dash-dotted line. As mentioned previously, the potential in the point b will drop as the capacitor is charged, the potential in the point b being controlled by the amplifier F. When the potential in the point b, which is designated $U_b$, attains the same value as the potential $U_b$ the comparator K senses that the two voltages are the same, which means that a recording pulse is emitted. This recording pulse controls a regulator R which breaks the energy supply to the generator 7 and thereafter acts upon the contact element S in such a manner that the contact is closed, which means that the capacitor C is discharged.

The sealed object now is removed from its sealing position and the sealing element 1 is made to engage with a new sealing object. and when this has taken place the generator 7 is reconnected to a source of current, the sealing element is activated and a new sealing pulse is generated.

In the manner as described above it is thus possible to obtain sealing pulses with constant energy content regardless of the effect of the sealing pulses, since a lower effect gives a lower output voltage 19 from the multiplier 18 which in turn means that the amplifier F is controlled in such a manner that the charging current through the capacitor C will become less and the charging time longer. In other words it takes longer for the potential in the point b to drop to the same value as the potential in the point c.

However, the circuit described does not provide any compensation for heat losses, but endeavors to deliver pulses from the electric feed generator with the same energy content irrespectively of the varying power output. It is possible, though, by a slight modification of the circuit to compensate for heat losses brought about by a prolonged sealing period. This may be done in that a variable leakage resistor 21 is inserted between the point a and a constant potential in the point d which in the present case is negative. Since there is a potential difference between the point 19 and the point d (the point 19 in general has a potential which is positive and is of a magnitude of one or more Volt) a current will pass straight through the resistor 20 and the resistor 21. This current has the effect that a voltage drop will arise across the resistor 20 which causes the potential in the point a to differ from, and be lower than, the potential in the point 19. This means that the regulator F will be controlled in such a manner that the charging current becomes smaller, and that as a result it will take a longer time to charge the capacitor C and to attain the voltage $V_c$ at the point b. In FIG. 4 a dash-dotted line 27 has been plotted which represents the compensated curve 23 and, as is evident from the curve 27, this curve crosses the value $U_c$ later than the curve 23. By adjusting the value on the resistor 21 the current through the resistor 20, and hence also the voltage drop across the resistor 20, can be varied so as to compensate for material with diverse thermal conductivity. Naturally the potential at the point 19 varies dependent on the power drawn from the source of current, but this voltage variation is small in relation to the voltage at the point d, so that it may be said, broadly speaking, that the compensation is independent of the power drawn off the generator 7.

In principle it may be said that the magnitude of the sealing pulse can be adjusted through appropriate setting of the potential at the point c with the help of the voltage divider 24 and that the compensation for heat losses is adjusted with the help of the variable resistor 21. The schematic arrangement described here functions well but it is possible, of course, within the scope of the concept of the invention to vary the appearance of the electric circuit in order to achieve the same result.

While this invention has been illustrated and described in accordance with a preferred embodiment, it is recognized that variations and changes may be made and equivalents employed herein without departing from the invention as set forth in the claims.

What is claimed is:

1. A method for regulating a supply of energy to a sealing device for sealing expanded plastic material comprising the steps of:
   pressing the sealing device against combined expanded plastic material to be sealed;
   supplying an energy pulse to the sealing device;
   measuring a value representative of the amount of energy drawn off by the sealing device;
   adjusting the measured value to compensate for heat losses which occur over time during the supply of the energy pulse to the sealing device;
   comparing the adjusted measured value with a predetermined value representative of an amount of energy adapted for the sealing operation; and
   cutting off the supply of the energy pulse to the sealing device when the adjusted measured value reaches the value representative of an amount of energy adapted for the sealing operation.

2. A method in accordance with claim 1, further comprising the steps of supplying electric energy to the driving part of an ultrasonic vibrator said driving part converting the electric energy to pulsating mechanical energy of high frequency.

3. The method of claim 1, wherein said measuring step incudes the steps of:
   measuring the voltage across a driving element of the sealing device and the current to said driving element,
   conducting one of said driving element voltage and a transformed voltage and one of said driving element current and a transformed current to a multiplier to generate an output voltage which is proportional t the product of the current and voltage fed to the multiplier and thus constitutes a value of the power supplied to the sealing device,
   conducting the multiplier output current to a capacitor which is shortable by a contactor element, and
   charging said capacitor under the control of an amplifier connected in parallel across said capacitor which regulates the magnitude of current through said capacitor as a function of the multiplier output voltage, and
   wherein the comparison step includes the steps of:
   conducting the amplifier output voltage which is the charging potential of the capacitor to a comparator, and
   continuously comparing said amplifier output voltage with a set voltage supplied to the comparator, a terminal of a source of current being controlled in response to a function of said continuous comparison, said control of said terminal being such that the source of current with the help of which the sealing device is fed is cut out when the difference between the compared voltages has been compensated.

4. The method of claim 1, wherein said adjustment step includes the step of conducting a current and a voltage to a multiplier and conducting the multiplier output current, which is substantially independent of the multiplier output voltage, through a leakage resistor during the period when the energy pulse is supplied to the sealing device, said leakage resistor being connected at one terminal to a point between said multiplier and a capacitor and at its other terminal to a constant potential.

5. The method of claim 4 further comprising the step of conducting the multiplier output voltage through a resistor located between said multiplier output and said leakage resistor, said comparing step including the step of controlling an amplifier with the voltage outputted from said resistor.

6. A method in accordance with claim 1, wherein the sealing device seals combined expanded plastic material by directing ultrasonic waves at the combined material.

7. The method of claim 3, further comprising the step of cutting in said source of current after said capacitor has been discharged by said contactor element and when a new sealing object has been placed into a working position.

8. A system for controlling the energization of a sealing device which seals expanded plastic material through the surface fusion of parts brought together and pressed against each other comprising:
- a source of current,
- transmitting means for cutting in said source of current to activate said sealing device and for transmitting an energy pulse required for a sealing operation to said sealing device,
- means for controlling the duration of the energy pulse to compensate for heat loss occurring during the sealing operation, said controlling means including
  - a multiplier having an output voltage proportional to the product of a voltage and a current transmitted by said source of current,
  - an adjustable leakage resistor connected between the multiplier and the transmitting means, the adjustable leakage resistor being adapted to shunt out current delivered from the multiplier and being connected in series such that a voltage drop occurs and an adjusted multiplier output voltage is created,
  - an integrating circuit including transmitting means to transmit a substantially constant current proportional to said adjusted multiplier output voltage and a capacitor charged by the current delivered by said transmitting means and having a contactor element connected in parallel across its terminals, and
  - a comparator connected to said transmitting means, said comparator transmitting a regulating pulse in response to a comparison between a voltage supplied to said comparator and a set reference voltage, said regulating pulse interrupting the energy supply from said source of current and closing the contactor element of said capacitor to discharge said capacitor.

9. The sealing device control system according to claim 8, further comprising an adjustable leakage resistor connected between said multiplier and said transmitting means, said adjustable leakage resistor being adapted to shunt out current delivered from the multiplier and being connected in series such that a voltage drop is created so as to reduce a potential which controls said transmitting means.

* * * * *